May 7, 1963  A. J. BAECK  3,089,083
INTELLIGENCE TRANSMITTING MEANS
Filed Feb. 29, 1960
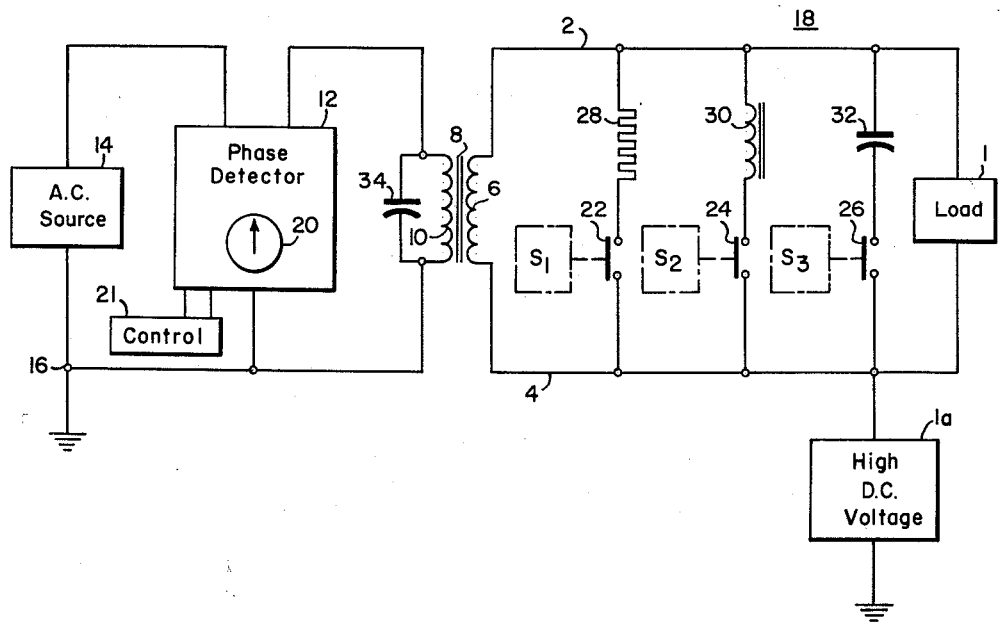
WITNESSES
Edwin E. Bassler
James F. Young
INVENTOR
Alfred J. Baeck
BY
John L. Stoughton
ATTORNEY 3,089,083
INTELLIGENCE TRANSMITTING MEANS
Alfred J. Baeck, Catonsville, Md., assignor to Westinghouse Electric Corporation, East Pittsburgh, Pa., a corporation of Pennsylvania
Filed Feb. 29, 1960, Ser. No. 11,676
2 Claims. (Cl. 323—125)

This invention relates to a load condition sensitive indicating network for indicating the load conditions of a high voltage load, and more particularly to such a network in which the alternating potential power supplied to such network and the functional information to be supplied from such network is transferred to and from the low voltage network through the same isolating transformer.

The use of transformers in the alternating current field is quite common for the purpose of stepping voltage up and down and for electrically isolating two interconnected circuits. Isolating transformers have been used in the electronic field for transferring information from a network operating at a high voltage level with respect to ground to a network which operates at a much lower voltage with respect to ground so that the danger to the operators is reduced. In such networks a second transformer has been used to supply alternating power to the high voltage circuit.

It is an object of this invention to provide a network in which a single transformer may be used for transferring both power and function sensing or intelligence signals between a power supplying circuit of relatively low voltage and a load circuit of higher voltage.

A more specific object is to provide in such a network a phase sensitive circuit for indicating the power factor of the supply circuit and means in the high voltage circuit for changing the load power factor in response to a change in an operating condition of the load circuit.

A further object is to provide a network for supplying alternating potential power to, and for obtaining functional information from, a high voltage network which combination is less costly to manufacture and which reduces the size and weight of the equipment previously thought necessary.

Other objects will be apparent from the specification and claims and the drawing, the sole FIGURE of which schematically illustrates a preferred form of the invention.

Referring to the drawing by characters of reference, the numeral 1 designates an alternating current load device which may itself require a high alternating voltage and therefore be potentially dangerous to operating personnel or such load 1 may form part of a direct current network (not shown) which has a high level of voltage with respect to ground as indicated at 1a. The device 1 is energized through conductors 2 and 4 connected to the secondary winding 6 of an isolating transformer 8. The primary winding 10 of the transformer 8 is connected through a phase detector or indicator 12 to a source 14 of alternating potential which is of relatively low voltage and which may have one terminal thereof grounded as at 16.

In accordance with my invention, the intelligence to be transmitted from the high level D.C. network is arranged to change the phase of the current and voltage in the high voltage portion 18 of the alternating current network. This change in phase is then detected in the low voltage portion of the A.C. network by the phase detector 12 which has a meter 20 for indicating the power factor. If desired the detector 12 may be interconnected with a control device 21 for automatically initiating a corrective or other remedial action through means (not shown).

If the characteristic which is to be transferred should happen to inherently cause a change in the phase of the current with respect to the voltage supplied to the network 18, the existence of such a characteristic will be indicated by the meter 20. If, however, a change in the subject characteristic would not result in a phase change, means must be provided to cause such a change. In this case a characteristic sensing device may be arranged to actuate a switching device to vary the impedance of the high voltage circuit portion 18 before the existence of such a characteristic will be indicated by the meter 20.

Three such sensing devices $S_1$, $S_2$ and $S_3$ are shown in the drawing and these devices respectively control the switches 22, 24 and 26. The switch 22 controls current flow through a resistor 28, while switches 24 and 26, respectively, control current flow through an inductance 30 and a capacitor 32. If it is assumed that the load 1 is not pure resistance, closure of any of the switches 22, 24 and 26 will result in a change in the phase of the current with respect to the voltage which is in the circuit portion 18. When the magnitudes of the impedance devices 28, 30 and 32 are so related with respect to each other and to the impedance of the load that a different power factor will be noted for any combination of positions of the switches 22, 24 and 26, the indicator 20 may, if desired, be calibrated to directly indicate the transmitted intelligence rather than calibrated to indicate the power factor. It will be understood that additional phase controlling circuits may be added to provide for a greater number of intelligence items to be transferred through the isolating transformer.

The phase detector may be of any desired type in which there is an output signal visual or otherwise which indicates the phase of the current with respect to the voltage which is being supplied to the transformer 8. Phase or power factors indicating instruments are well-known in the art and since there is no invention in the use of any particular instrument, per se, it is shown in block form. Two types of such instruments are, however, illustrated in U.S. Patents, 730,397 and 2,525,448, among others. If desired, a capacitor 34 may be connected across the winding 10 to compensate for the magnetizing current of the winding 10.

The operation is as follows: during operation with the switches 22, 24 and 26 open (the sensing devices $S_1$, $S_2$ and $S_3$ satisfied), the phase of the current with respect to the voltage in the high potential circuit portion 18 is determined by the requirements of the load 1. When a change in the condition of one of the characteristics which is to be sensed occurs, the phase angle of the current relative to the voltage in the circuit portion 18 changes either as a consequence of a device S being actuated or directly if the characteristic itself results in a phase change. This change is reflected through the isolation transformer 8 as a change in phase angle of the current and voltage in the low potential portion of the A.C. network and is indicated by the meter 20.

The devices S may maintain their respective switches closed and open it upon the occurrence of a critical magnitude of such characteristics or vice versa. It is preferable, however, to arrange the circuit such that the switch 24 is open during the normal conditions of the characteristic to which $S_2$ is sensitive since with this arrangement, the current in the circuit portion 18 is less and the network efficiency is increased.

Assume the device $S_2$ actuates the switch 24 to closed position. When such occurs, the impedance device 30 is connected between the conductors 2 and 4 and the loading in the circuit portion 18 will of course be changed. As shown, the device 30 is inductive in nature and conducts sufficient current so that when it is energized, the phase of the current with respect to the voltage traversing the transformer 8 will be changed in a lagging direction.

Such change in phase angle will be indicated on the meter 20 which as suggested above may be calibrated in any desired terms. Similarly, the devices $S_1$ and $S_3$ act to connect and disconnect the impedance devices 28 and 32 to cause changes in the power factor of the circuit portion 18.

While the devices 28, 30 and 32 are shown as solely resistance, inductance, and capacitance, this relationship of the devices 28, 30 and 32 is not required and the devices may be combinations thereof. It is desirable, however, to so choose the character and magnitude of the devices so that the phase angle of current with respect to voltage in the circuit portion 18 will assume a different value upon closure of any switch so that the meter 20 will indicate which device S is actuated. If closure of more than one switch can occur at the same time, a different value for any combination of the switches which may be closed at the same time is also desirable.

While there has been illustrated only a single embodiment of the invention, such embodiment is to be considered as illustrative rather than as limitative of the invention, which is to be limited only by the hereinafter appended claims.

What is claimed and is desired to be secured by United States Letters Patent is as follows:

1. A signalling system comprising first and second networks each having first and second sets of network terminals, a transformer having first and second sets of transformer terminals, means coupling said first set of transformer terminals to said first set of terminals of said first network and said second set of transformer terminals to said first set of terminals of said second network, said second set of terminals of said first network being adapted to be connected to a source of pulsating electrical potential, said second set of terminals of said second network being adapted to supply a load, a plurality of impedance devices, a plurality of current regulating apparatuses, means individually connecting said impedance devices through individual ones of said apparatuses to one of said first and second networks, a plurality of condition responsive means individually associated with said current regulating apparatuses for controlling current flow through its associated said impedance device, each said condition responsive means being responsive to a change in the magnitude of a condition beyond a predetermined magnitude for actuating the said current regulating apparatus with which it is associated to maintain the current flow through its associated impedance device at a magnitude dependent upon whether the magnitude of the said condition with which it is associated is above or below its said predetermined magnitude, the impedances of said impedance devices being different from each other so that the change in current flow through said impedance devices caused by a change in magnitude of any one of said conditions through its said predetermined magnitude will cause a change in the phase relationship of the current and voltage at said first pair of terminals of the other of said first and second networks, and a phase detector connected to said other network and sensitive to the phase relation of said current and voltage at said first pair of terminals of said other network for detecting whether the magnitude of any one of said conditions and which of said conditions is above or below its respective said predetermined magnitude.

2. A signalling system comprising first and second networks each having first and second sets of network terminals, a transformer having first and second sets of transformer terminals, means coupling said first set of transformer terminals to said first set of terminals of said first network and said second set of transformer terminals to said first set of terminals of said second network, said second set of terminals of said first network being adapted to be connected to a source of pulsating electrical potential, a load device coupled to said second set of terminals of said second network, a plurality of impedance devices, a plurality of current regulating apparatuses, means individually connecting said impedance devices through individual ones of said apparatuses to said second network, a plurality of condition responsive means individually associated with said current regulating apparatuses for controlling current flow through its associated said impedance device, each said condition responsive means being responsive to a change in the magnitude of a condition beyond a predetermined magnitude for actuating the said current regulating apparatus with which it is associated to maintain the current flow through its associated impedance device at a magnitude dependent upon whether the magnitude of the said condition with which it is associated is above or below its said predetermined magnitude, the impedances of said impedance devices being different from each other so that the change in current flow through said impedance devices caused by a change in magnitude of any one of said conditions through its said predetermined magnitude will cause a change in the phase relationship of the current and voltage at said first pair of terminals of the other of said first network, a phase detector connected to said other network and sensitive to the phase relation of said current and voltage at said first pair of terminals of said other network for detecting whether the magnitude of any one of said conditions and which of said conditions is above or below its respective said predetermined magnitude, and a direct potential connected to said second network.

References Cited in the file of this patent
UNITED STATES PATENTS 2,243,584  Toda ------------------ May 27, 1941